Aug. 15, 1944.  B. J. WOLFE  2,355,936
ARC LAMP
Filed May 31, 1943

BERNARD J. WOLFE
INVENTOR

BY
ATTORNEYS

Patented Aug. 15, 1944

2,355,936

UNITED STATES PATENT OFFICE 2,355,936

ARC LAMP

Bernard J. Wolfe, Irondequoit, N. Y., assignor to Bausch & Lomb Optical Company, Rochester, N. Y., a corporation of New York Application May 31, 1943, Serial No. 439,171

6 Claims. (Cl. 314—56)

The present invention relates to electric arc mechanisms and more particularly to the feeding means for the electrodes.

Heretofore, in many of the automatic feeding mechanisms of the type employing flexible connections, such as chains and the like, means were provided for simultaneously moving both electrodes as the electrodes wasted away during the operation of the lamp. Although these means regulated the distance separating the electrodes, they did not insure proper spacing of the electrodes at an angle wherein the arc illumination was reflected from the crater of the positive electrode along the axis of the optical system, a function of primary importance in the operation of an arc lamp. This defect in the efficient performance of the feeding mechanisms was caused by the uneven burning of the electrodes. As the electrodes are simultaneously advanced, the resultant spacing of the electrodes would necessarily deviate the arc illumination reflected from the crater of the positive electrode from the axis of the optical system. To secure the proper spacing of the electrodes, the operator was required to stop the operation of the arc lamp and then manually remove and reposition the electrodes in their holders.

Considerable difficulty was experienced by the operator in properly spacing the electrodes. Inasmuch as the feeding mechanism only permitted manual adjustment of the electrodes simultaneously by the operator while the electrodes were disposed in their holders, the operator necessarily had to stop the current flowing through the arc and also the operation of the feeding mechanism to manually remove and respace the electrodes. To respace the electrodes, the operator either had to permit the electrodes to cool sufficiently to manually handle them or to manipulate the hot electrodes with tools provided for this emergency. As is readily apparent, in the first case, the lamp was inoperative for some time and in the second case, the hands of the operator were often burned or the carbons broken. The removed electrodes were then adjusted in their holders by cut and try methods until the proper spacing was secured. As the operator could only test the proper spacing of the electrodes by causing the arc to burn, several repetitions of the operations necessary to respace the electrodes were often required. Also, when both electrodes were placed in the holders for the first time, the operator was often required to respace the electrodes and thereby encountered the same difficulties.

The present invention has for its primary object the provisions of novel manual adjusting means permitting individual and correct spacing of the electrodes in an automatic feeding mechanism having flexible connections simultaneously advancing the electrodes. Although the feeding mechanism, embodying the means of the present invention, has other manual means incorporated therein for simultaneously moving the electrodes, the novel adjusting means cooperating with these manual means permits one electrode point to be independently moved relative to the other electrode to thereby secure adjustment of the electrodes in their correct spaced relation without removing and replacing the electrodes in their holders, thus obviating the difficulties had in prior feeding mechanisms of this type.

Other objects and advantages of the invention will be apparent during the course of the following description.

Figure 1:
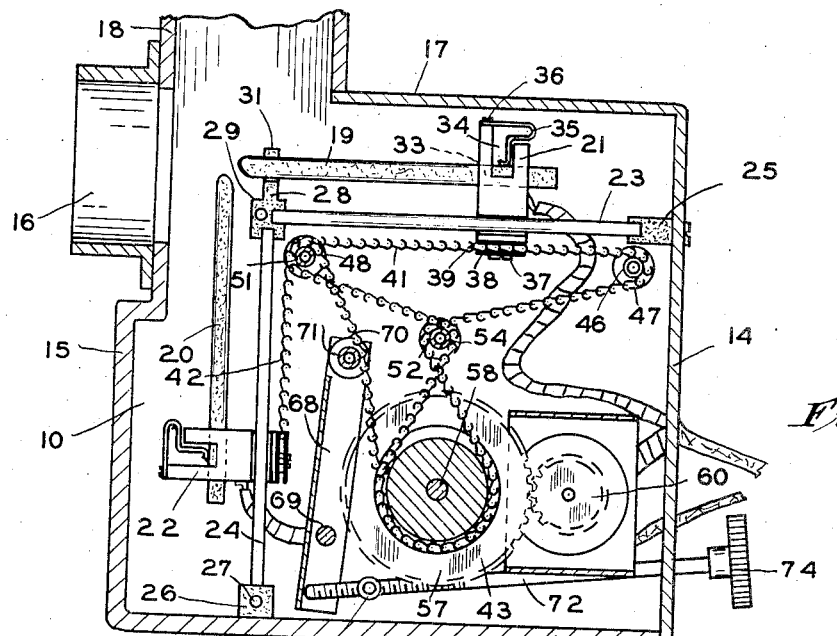
Fig. 1 is a side view of the lamp with a side wall removed showing the novel adjusting means of the present invention.
Figure 2:
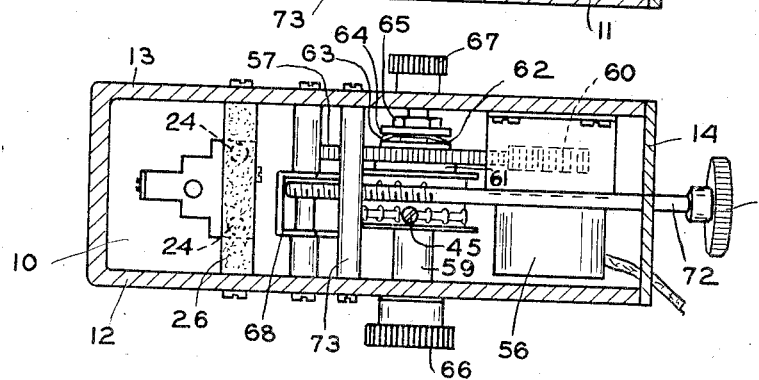
Fig. 2 is a bottom view with the bottom wall removed.
Figure 3:
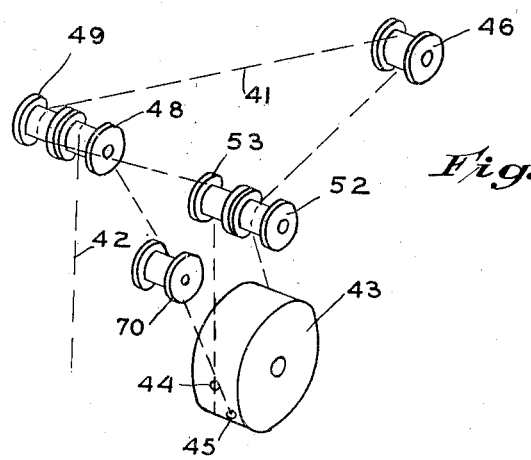
Fig. 3 is a diagrammatic view illustrating the chain drive for the electrodes in cooperation with the adjusting means.

In the preferred embodiment of my invention, the feeding mechanism and the novel adjusting device shown in Figs. 1 and 2 are positioned in a lamp housing or enclosure 10. The housing 10 is provided with a bottom wall 11, side walls 12 and 13 supporting the feeding mechanism and adjusting device, a back wall 14, a front wall 15 provided with a hollow extension 16 for insertion into a projection apparatus for the passage of the reflected illumination along the axis of the optical system, and top wall 17 having a hollow extension 18 to permit the escape of heat from the lamp housing.

The lamp housing 10 also contains the electrodes 19 and 20 and, for purposes of illustration, the electrodes are mounted at right angles to each other therein. As shown in Fig. 1, the horizontally disposed electrode 19 is removably mounted in a suitable holder or support 21 and the vertical electrode in a similar holder 22, these holders being slidably disposed, preferably upon a pair of horizontal guide rods 23 and a pair of vertical guide rods 24, respectively. The outer ends of the guide rods 23 are suitably connected with an insulating member 25 held fixed within the housing by attachment to the back wall 14 and the vertical guide rods 24 are suitably connected with an insulating member 26 held fixed within the housing 10 by a pin 27 extending between the walls 12 and 13. Both sets of guide rods have their inner or adjacent ends anchored in a block 28 of heat-resistant material which is fastened within the housing by a pin 29 and which is provided with an apertured extension 31 to serve as a support and guide for the upper electrode 19.

The electrode supports 21 and 22 are substantially identical and only one will be described. The support 21 is slidably mounted on a pair of guide rods 23 and is formed with a longitudinal bore 33 for receiving the electrode 19. A transverse slot 34 extends from the top of the support down past the upper side of the electrode. A leaf spring 35 is fixed to the support at 36 and has its free end bearing against the electrode to form a resilient attaching means for the electrode. Two insulating washers 37 and 38 fastened together to the bottom of the support 21 by a screw 39 form a stud for rigidly connecting the support 21 to a chain 41. The electrode support 22 is identical with that of the support 21 with the exception that one end of a chain 42 is secured thereto.

The means for advancing the electrode supports 21 and 22 preferably comprise flexible operating members 41 and 42 in the form of chains or like connections, the member 41 being an endless chain and the member 42 being a length of chain, fastened to a driving drum 43 at 44 and 45, respectively. The chain 41 is extended over a series of pulleys or rollers comprising an upper roller 46 mounted upon a support 47 suitably secured to the walls 12 and 13, a roller 49 of a pair of upper rollers 48 and 49 adjacently mounted upon a support 51, a pair of centrally disposed rollers 52 and 53 adjacently mounted upon a support 54, and the driving drum 43. The transversely extending supports or shafts, upon which the rollers are mounted, are suitably secured to the side walls 12 and 13. The chain 42 has one end secured to the electrode holder 22 and extends over the roller 48 to the drum 43 where its free end is secured. Rotation of driving drum in a counterclockwise direction will cause movement of the chain 41 and the chain 42 to simultaneously advance each of their attached electrode supports 21 and 22 at the same rate of speed and thereby maintain the free ends of the electrodes at the desired distance apart.

To secure rotation of the drum 43 to advance the electrodes as they are burned away and to keep their points the proper distance apart for securing maximum illumination, means are provided in the present embodiment of the invention for controlling and regulating the arc gap between the electrode points. These means comprise a motor arranged in a balancing electric circuit, not shown, and having mechanical connections for actuating the drum 43 to thereby simultaneously advance the electrodes to maintain a constant spaced distance between them. As best shown in Fig. 2, an electric motor 56 through a gear 60 drives a gear 57, loosely mounted on a shaft 58, through a clutch mechanism to thereby cause rotation of the drum 43 fixed to the shaft 58. A collar 59 is disposed between the side wall 12 and the drum 43 to maintain the drum 43 in spaced relation thereto for aligning the chains disposed thereon relative to their rollers and to prevent displacement of the drum 43 by the force exerted against it by the thrust of the gear 57. As the driving gear 57 is loosely mounted on the shaft 58 adjacent the drum 43, a clutch mechanism is utilized for providing a positive driving connection between the gear 57 and the drum 43. The clutch mechanism may comprise as shown, a fiber washer 61 carried by the shaft 58 and disposed between the drum 43 and the gear 57 and a second washer 62 carried by the shaft adjacent the opposite face of the gear. A spring member 63, seating on a metal washer 64 held against upward movement as viewed in Fig. 2 by the nut 65 urges the washer 61, gear 57, and washer 62 downwardly as viewed in Fig. 2. The frictional engagement between the contacting faces of the gear 57, washer 62, and drum 43 should be such that the drum will be normally coupled to the gear for rotation therewith but yet permit relative movement between the gear and drum under certain operating conditions. Therefore, the drum may be moved back and forth by the hand wheel 66 or 67 to simultaneously advance or reverse the electrode holders, the friction exerted by the clutch on the drum being insufficient to cause rotation of the driving gear 57. Also, the clutch mechanism insures disengagement of the driving connection to the electrodes when the electrodes become burned out and the electrode supports abut the block 28, or the feeding mechanism fails to function due to restraint placed upon any of its members by a mechanical breakdown, as the drum 43 will be declutched so that the feeding mechanism will not be damaged by the actuation imparted thereto by the motor 56, as the gear 57 will rotate without driving the drum 43.

The automatic feeding mechanism of the present invention is adapted to control and regulate the movement of the electrodes to maintain their arc gap constant by preferably utilizing the electric balancing circuit described and shown in U. S. Patent 2,129,530, issued September 6, 1938, to Allan F. Martin, and may be used with any other electric balancing circuit utilizing the amount of current flowing through the arc to regulate the direction and amount of current flowing through the armature of the motor 56.

To secure the proper adjustment in the correct spacing of the electrode points should they be improperly positioned relative to one another, or by their uneven burning, without removing the electrodes from their holders, novel adjusting means of the present invention are provided to reposition the electrode 20 relative to the electrode 19 so that the arc will be reflected from the crater of the electrode point 19 along the axis of the optical system and also to minimize the shadow cast by the electrode point 20. This novel adjusting means provided in the present preferred embodiment of the invention, cooperating with the manual adjustment of the electrodes by the feeding mechanism, permits the electrode points 19 and 20 to be manually adjusted in their correct spaced position when the arc is burning, thus dispensing with the removal of the electrodes from their holders and the difficulties attendant thereto.

As can be seen from the description of the means for advancing the electrodes, manipulation of either of the hand wheels 66 or 67 by the operator will cause the drum 43, acting through the chains 41 and 42, to move the electrode holders, and thereby the electrodes, simultaneously for advancing or reversing the electrodes to vary the arc gap between them. To permit the individual manual adjustment of the respective electrodes, the novel adjustment means is adapted to engage the chain 42 through a roller 70 to cause the chain to move out of its normal path of travel to thereby raise or lower the point of the electrode 20 to or from the point of the electrode 19. The adjustment mechanism for performing this desirable result comprises a U-shaped member or lever 68, pivotally mounted on a shaft 69 extending between the walls 12 and 13 and having the roller 70 mounted between the sides of the member 68 by a pin 71. The other end of the member 68 is adapted to receive the end of a shaft 72 for causing the member 68 to pivot on its shaft 69 so that the roller 70 will be forced inwardly against the chain 42. The shaft 72 screws into a tapped opening in a shaft 73 and has its outer end projecting through an opening in the back wall 14 of the housing. As the shaft 73 is mounted between the side walls 12 and 13 of the housing, the shaft 72 will be so disposed that the turning of the hand wheel 74 will cause the member 68 to pivot on the shaft 69 so that the roller 70 will be forced against the chain 42 to thereby raise the point of the electrode 20 into a desired spaced relation with the electrode 19, the weight of the holder 22 will cause the chain 42 to bear against the roller so that when the hand wheel 74 is moved in a reverse direction, the electrode will be lowered. The inertia of the drum 43 will prevent movement of the drum when the roller 70 is moved against the chain 42 to deviate a portion of the chain 42 from its normal path of travel and thereby raise the holder of the electrode 20.

In the adjustment of the electrodes, the chain 42 is deviated from its normal path of travel by the roller 70 through the actuation of the hand wheel 74 and then the electrodes are positioned in proper spaced relation by the manipulation of the hand wheel 66 or 67 and the hand wheel 74. Due to the simultaneous adjustment of the electrodes by the hand wheel 66 or 67 and the individual adjustment of the electrode 20 by the adjusting means of the present invention, the electrodes may now be individually displaced, when the arc is burning, to secure their correct spaced positions. In the use where the electrode 19 has burned away to a greater extent than the electrode 20, the electrode 20 may be lowered by rotation of the hand wheel 74 of the novel adjusting means, the electrode 19 advanced by the hand wheel 66 or 67 to its correct spaced position and then the electrode 20 raised to its correct spaced position. When the electrode 20 has burned away faster than the electrode 19, the electrodes 19 and 20 are reversed by the hand wheel 66 or 67 to place the electrode 19 in its correct spaced position and then the electrode 20 may be raised to its correct spaced position. In this manner, the electrode points need not be removed and replaced in their electrode supports by the operator manually handling the electrodes to secure their correct spacing by cut and try methods, nor is it necessary for the operator to break the circuit creating the arc and then permit the electrodes to cool.

From the foregoing, it will be apparent that I am able to attain the objects of my invention and provide an electrode adjustment device permitting individual adjustment of the electrodes of a feeding mechanism employing flexible connections for simultaneously moving the electrodes. Various modifications can, of course, be made without departing from the spirit of my invention or the scope of the appended claims.

I claim:
1. In an arc lamp, a housing; angularly disposed guides mounted in said housing; a holder mounted for movement on each guide; an electrode carried by each holder; flexible members disposed within said housing and interconnecting said holders; means for driving said flexible members to advance said holders toward each other; manually operable means for driving said members to reciprocally move said holders; and manually operable means separate from said first-named manually operable means for deviating one of said flexible members from its normal path of travel for moving one of said electrodes relative to the other of said electrodes.

2. In an arc lamp, a housing; angularly disposed guides mounted in said housing; a holder mounted for movement on each guide; an electrode carried by each holder; flexible members disposed within said housing and interconnecting said holders; means for driving said members to advance said holders toward each other; manually operable means for driving said members to reciprocally move said holders; and a manually adjustable member mounted adjacent one of said flexible members in said housing and adapted to move transversely thereof to deviate a portion of said member from its normal path of travel for reciprocating its connected electrode relative to the other of said electrodes.

3. In an arc lamp, a housing; angularly disposed guides mounted in said housing; a holder mounted for movement on each guide; an electrode carried by each holder; a plurality of rollers; a drum; an endless flexible member connected to one of said holders and passed about some of said rollers, said member being fixed to said drum; a flexible member having one end secured to said drum, the opposite end of said member being passed over the other of said rollers and fixed to the other of said holders; means for driving said drum in opposite directions to reciprocally move said holders; and manually operable means for deviating said second-named member from its normal path of travel for moving its connected electrode relative to the electrode attached to said endless member.

4. In an arc lamp, a housing; angularly disposed guides mounted in said housing; a holder mounted for movement on each guide; an electrode carried by each holder; a plurality of rollers; a drum; an endless flexible member connected to one of said holders and passed about some of said rollers, said member being fixed to said drum; a flexible member having one end secured to said drum, the opposite end of said member being passed over the other of said rollers and fixed to the other of said holders; means for driving said drum in opposite directions to reciprocally move said holders; and manually operable means for lengthening the path of movement of said second-named flexible member extending between one of said rollers and said drum.

5. In an arc lamp, a housing; angularly disposed guides mounted in said housing; a holder mounted for movement on each guide; an electrode carried by each holder; a plurality of rollers; a drum; an endless flexible member connected to one of said holders and passed about some of said rollers, said member being fixed to said drum; a flexible member having one end secured to said drum, the opposite end of said member being passed over the other of said rollers and fixed to the other of said holders; means for driving said drum in opposite directions to reciprocally move said holders; and a manually operable device pivotally mounted adjacent said second-named member and adapted to selectively move a portion of said member extending between said drum and one of said rollers from its normal path of travel, the movement of said member reciprocating the electrode attached to said second-named member relative to the electrode of said endless member.

6. In an arc lamp, a housing; angularly disposed guides mounted in said housing; a holder mounted for movement on each guide; an electrode carried by each holder; a plurality of rollers; a drum; an endless flexible member connected to one of said holders and passed about some of said rollers and said drum, said member being fixed to said drum; a flexible member having one end secured to said drum, the opposite end of said member being passed over the other of said rollers and fixed to the other of said holders; means for driving said drum in opposite directions to reciprocally move said holders; a lever pivotally mounted adjacent said second-named member for engagement therewith; and a manually operable member movably mounted in said housing for engagement with said lever, the actuation of said manually operable member adapted to move said lever back and forth to thereby selectively move a portion of said second-named member extending between said drum and one of said rollers from its normal path of travel whereby the electrode attached to said second-named member may be reciprocated relative to the electrode of said endless chain.

BERNARD J. WOLFE.